United States Patent [19]
Ely et al.

[11] 3,882,886
[45] May 13, 1975

[54] SUPPORT DEVICE FOR FLEXIBLE HOSES

[75] Inventors: Ronald E. Ely; Warner G. Richardson, both of Joliet, Ill.

[73] Assignee: Caterpillar Tractor Company, Peoria, Ill.

[22] Filed: Apr. 1, 1974

[21] Appl. No.: 456,972

[52] U.S. Cl. ............... 137/344; 285/114; 248/75; 280/421; 137/355.17
[51] Int. Cl. ............................................. F16l 13/04
[58] Field of Search . 137/351, 344, 355.16, 355.17; 285/114; 248/75, 79; 280/421, 422

[56] References Cited
UNITED STATES PATENTS
2,668,557    2/1954    Hoelscher .................... 285/114

Primary Examiner—Henry T. Klinksiek
Attorney, Agent, or Firm—Phillips, Moore, Weissenberger, Lempio & Strabala

[57] ABSTRACT

A support system for flexible members such as hydraulic hoses, cables and the like. The system includes an elongated non-metallic flexible band attached at opposite ends thereof to two relatively movable members between which the hydraulic hoses extend. The flexible non-metallic band includes a plurality of flexible bundling straps, of cloth material or the like, attachable to both the non-metallic band and the hoses so as to produce a relatively self-supporting grouping of hoses and band. When held by the instant support system, the hoses are constrained to move in a plane normal to the axis of rotational movement between the first and second relatively movable members.

9 Claims, 3 Drawing Figures

PATENTED MAY 13 1975
3,882,886
SHEET 2 OF 2
Fig_2_
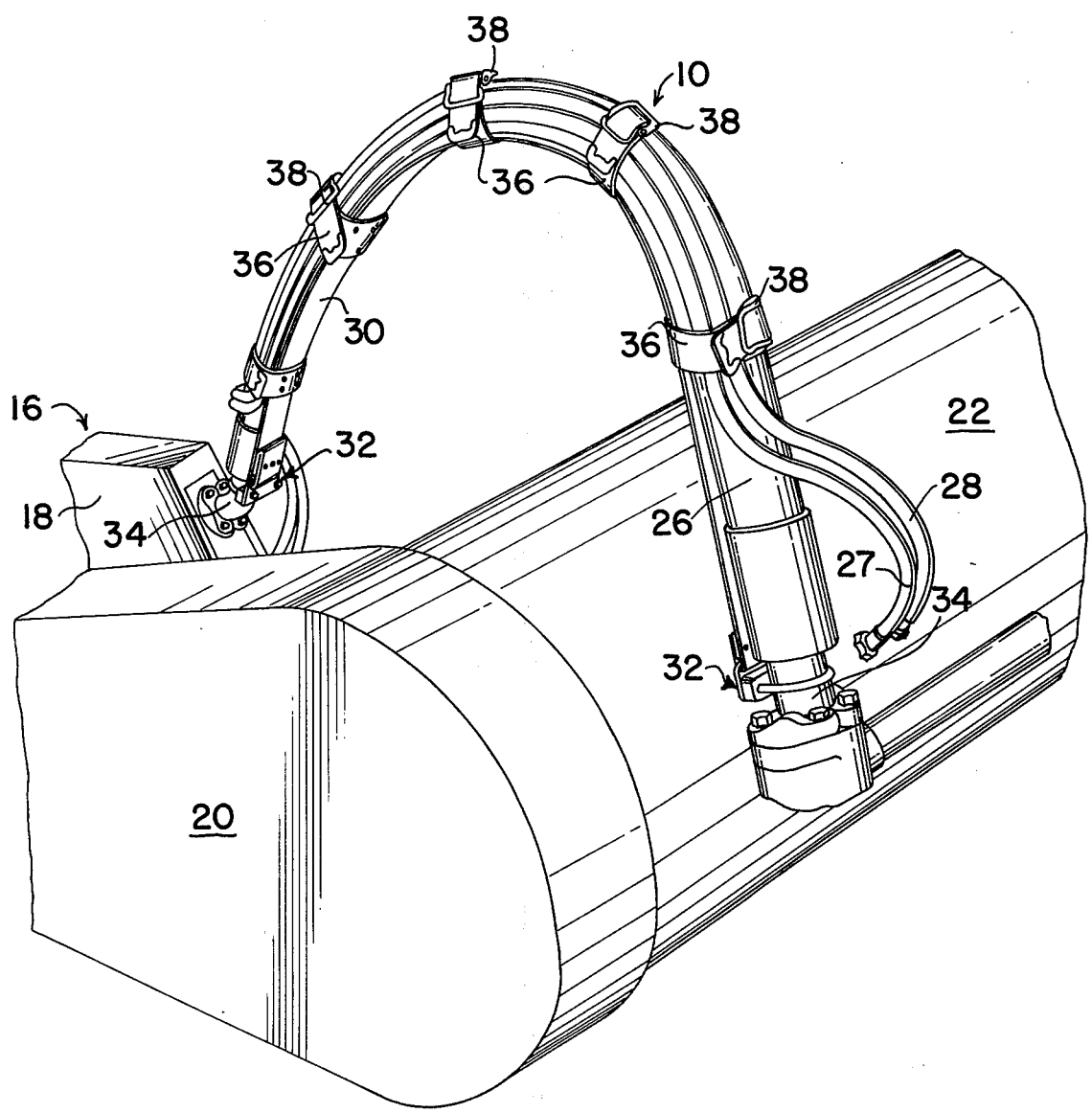

SUPPORT DEVICE FOR FLEXIBLE HOSES

CROSS-REFERENCE TO RELATED APPLICATIONS

The present invention is intended as an improvement of the support system disclosed and claimed in U.S. application Ser. No. 379,587 entitled "Tether Band for Flexible Hydraulic Hoses," filed July 16, 1973 by Lawrence J. Miller, et al., of common assignment herewith. This application is also related to U.S. application Ser. No. 420,064 entitled "Articulated Support for Hydraulic Hose," filed on Nov. 29, 1973 by Lawrence J. Miller et al., also of common assignment herewith.

BACKGROUND OF THE INVENTION

Flexible members such as reinforced hydraulic hoses or cables are often placed across parts of machinery which move relative to each other. For example, in an earthmoving scraper vehicle, a plurality of hydraulic hoses for operating hydraulic jacks and the like extend between the engine carrying tractor portion and the scraper bowl portion which portions are articulated for steering purposes. Similar hoses extend between various relatively movable members of the scraper portion, per se. In such a vehicle, relative movement between the members is often substantial and the hydraulic hoses must be configured in large loops or coils in order to accommodate such movement without undue hose wear or damage. Where the hose used is highly flexible, it is necessary to control the movement of such loops or coils when they are disposed in close proximity to moving parts in order to prevent damage thereto by abrasion or from stresses caused by twisting or tangling.

Generally, it is important to constrain the hose loops solely for movement in various directions within the plane of such loops. Lateral movement, in a direction normal to the plane of the loops, would cause twisting and possible failure of the hose members. Another problem in constraining such hose loops results from the radial and axial expansion and contraction of the hoses as they respond to internal pressure changes. Acceptable hose restraining systems must not grip the hoses in a manner which could cause local stresses while tethering against undesired lateral movement.

In addition to the prior art found in the above-noted related patent applications, another example of a prior art attempt to constrain and mount flexible members such as hoses is found in U.S. Pat. No. 3,776,403 to Billings.

SUMMARY AND OBJECTS OF THE INVENTION

The instant invention provides a hose support arrangement for attachment to a hose or a plurality of hoses extending between two relatively movable members. The support arrangement includes a flexible non-metallic band connected by suitable means to each of said relatively movable members. Attached to the band are a plurality of fabric strap means with buckles which readily enable the bundling together of the hoses and non-metallic band so as to form a self-supporting loop or arch structure. The non-metallic flexible band is flexible only within the plane of the loop formed by the bundled hoses and effectively restricts lateral movement of such hoses during use.

An object of the present invention is to provide a mounting arrangement for a flexible hydraulic hose which has been formed into a loop or semi-loop and mounted between two relatively movable parts of a scraper vehicle.

Another object of the present invention is to provide a hose supporting arrangement which reduces the transmission of induced dynamic forces to the hose loop.

A further object of the present invention is to provide a supporting structure for flexible hoses which prevents a hose loop from fouling in adjacent moving parts of the vehicle and for protecting the hoses from damage due to abrasion and impact.

A still further object of the present invention is to provide supporting structure for flexible hoses which includes a plurality of soft fabric bundling belts or straps which accommodate the growth and contraction of hose diameters and loop size as the hoses respond to increased and decreased internal pressures.

Yet another object of the present invention is to provide a hose supporting arrangement which includes a non-metallic band flexible in only one plane to which is attached a plurality of soft fabric straps for inclusion with a plurality of hydraulic hoses as a bundle capable of supporting itself against movement in all but a single plane.

Another object of the present invention is to provide such a supporting arrangement wherein the non-metallic band is anchored to rigid hose fittings on each of the two relatively movable members.

A still further object of the present invention is to provide such a supporting device wherein the plurality of woven material straps are secured to the flexible non-metallic band by means of rivets.

Another object of the present invention is to provide such a hose supporting device wherein a pair of U-shaped clamps are secured to opposite ends of the flexible band for securing such ends to the rigid hose fittings on the two relatively movable members.

Other objects and advantages of the present invention will become apparent from the following description and drawings.

BRIEF DESCRIPTION OF THE DRAWINGS

FIG. 2 is an enlarged isometric view of the hose supporting arrangement shown in FIG. 1.

DETAILED DESCRIPTION

Figure 1:
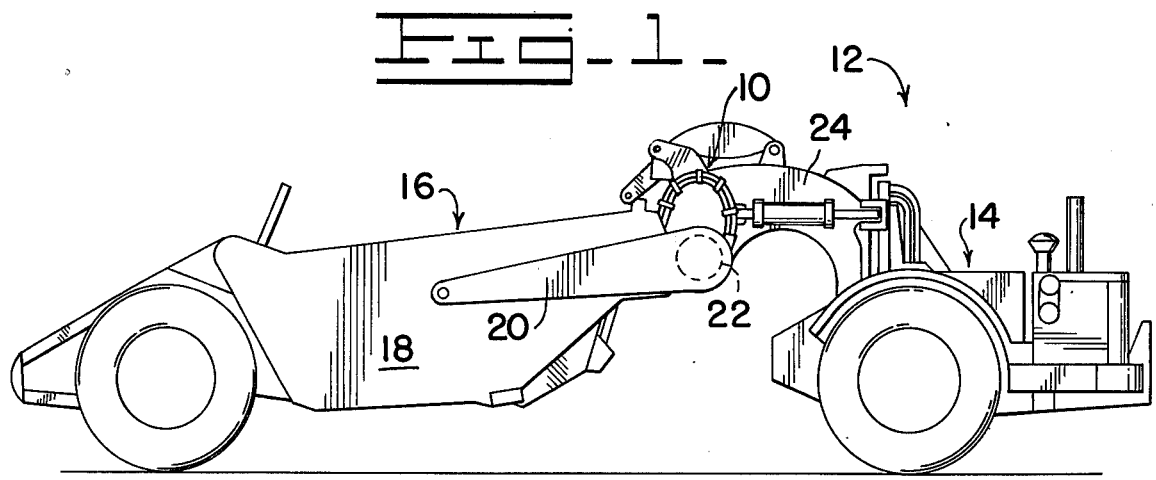
FIG. 1 is a schematic elevation of an articulated earthmoving scraper vehicle embodying the present invention.

With reference to the drawings, the instant flexible supporting arrangement is indicated generally at 10. The arrangement is shown applied to a scraper vehicle 12 having a tractor 14 articulately coupled to a scraper bowl 16. The scraper bowl 16 has a pair of laterally spaced side walls, one of which is shown at 18, each of which has a draft arm 20 pivotally connected thereto. The draft arms extend forwardly in parallel relation and are attached to opposite ends of a transversely or laterally extending spreader tube 22 which is mounted through a goose neck 24 to the tractor 14.

Figure 3:
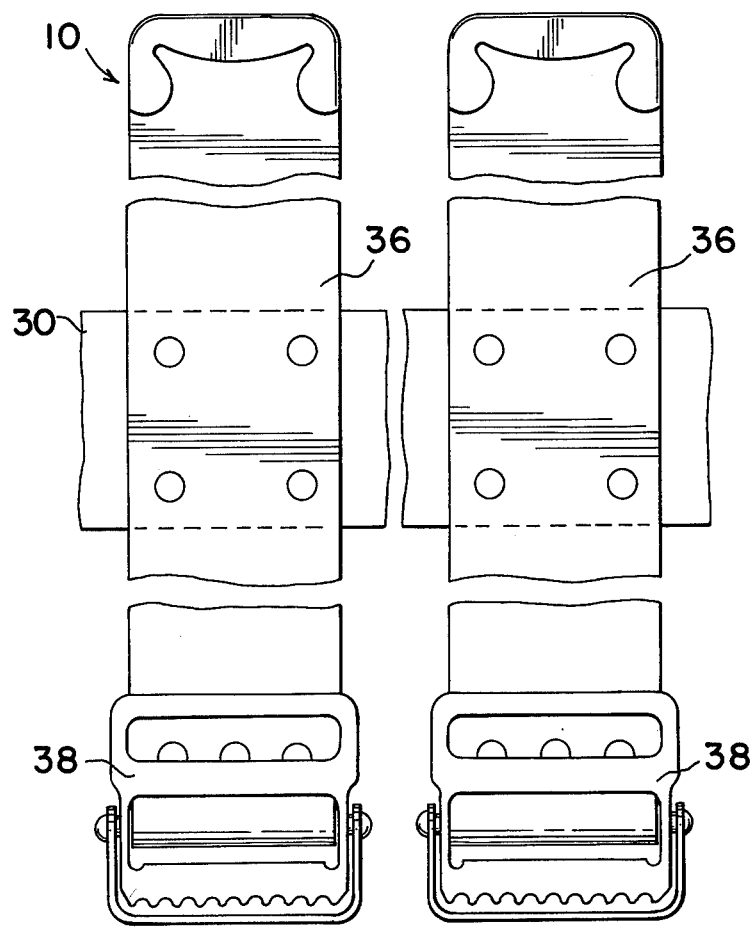
FIG. 3 is an enlarged partial view showing the non-metallic band with bundling straps attached thereto.

With particular reference to FIGS. 2 and 3, a plurality of flexible hydraulic hoses 26, 27 and 28 communicate hydraulic fluid from the spreader tube 22 to the scraper bowl 16 for the purposes of operating hydraulic jacks and the like. Such hoses have one end thereof connected proximate one end of the spreader tube 22 and the other end thereof connected to an adjacent portion of the scraper bowl sidewall portion 18. The hoses are disposed in a relatively large loop, as shown, for accommodating relative up-and-down movement between the spreader tube and the scraper bowl with the parts as oriented in FIG. 1.

The inventive support arrangement includes an elongated non-metallic band member 30 fabricated from woven cloth material or the like and capable of flexing only in a plane normal to its lateral projection. The non-metallic band 30 is adapted to be disposed beneath the hoses 26, 27 and 28, as shown in FIG. 2 to form the interior portion of an arch or loop structure.

A pair of U-shaped clamps 32 are secured to opposite ends of the non-metallic band 30 by means of rivets or the like and such clamps are adapted to secure the ends of the band member to rigid hose fittings 34 at opposite ends of the hose 26.

A plurality of non-metallic material straps 36, which might be of woven cloth material or the like, are secured by rivets or the like to the non-metallic band member in spaced relation along the length thereof. One end of each strap member is provided with a buckle 38 for securing the straps once they are wrapped around the hoses for securing purposes.

With the straps 36 securely fastened around the hoses, the bundled hoses and supporting band 30 combine to form a relatively stiff assembly which holds the hoses in the position shown in FIGS. 1 and 2 and which effectively eliminates movement of the bundle in directions outside the plane of the arch or loop shown.

It should be noted that each of the elements; i.e., the band 30, the hoses 26, 27, 28, are not independently capable of a suitable support function. However, the combined and fastened bundle of elements is effectively self-supporting. As shown in FIG. 2, the hoses are free to move up-and-down within the plane of the loop to compensate for relative movements between the tractor and the scraper bowl of the vehicle.

While the invention has been described with particular reference to the preferred embodiment, it is apparent that variations and modifications are possible within the purview of the inventive concepts. No limitation with respect to such variations and modifications is intended, except by the scope of the appended claims.

We claim:

1. A supporting system for a flexible member extending between first and second relatively movable members and attached to said first and second relatively movable members at first and second ends of said flexible member, said supporting system including non-metallic band means extending between said first and second relatively movable members and attached respectively at opposite ends thereof for movement with said first and second movable members, said non-metallic band means including flexible strap means for flexible attachment to said flexible member, said flexible member and said non-metallic band means when secured together by means of said strap means form a self-supporting bundle capable of appreciable flexure in only one predetermined plane.

2. The invention of claim 1 wherein said first and second relatively movable members are first and second components of an earthmoving scraper vehicle and wherein said flexible member is a first hydraulic hose attached to said first and second components by means of relatively rigid hose fitting members.

3. The invention of claim 2 wherein said non-metallic band means include an elongated flexible band member having opposite ends thereon each one respectively attached to one of said rigid hose fitting members on said first and second components.

4. The invention of claim 3 wherein said opposite ends are attached to said fitting members by U-shaped rigid clamping means.

5. The invention of claim 3 wherein said flexible strap means include at least one strap member fabricated from woven cloth material and equipped with buckle means for fastening said strap member about said hydraulic hose.

6. The invention of claim 5 wherein said strap member is attached to said elongated band member by means of rivets.

7. The invention of claim 5 wherein said elongated band member is fabricated from woven cloth material.

8. The invention of claim 3 further including a plurality of hydraulic hoses, each bundled together with said band member and said first hydraulic hose by said strap means to form an arcuate loop configuration.

9. The invention of claim 8 wherein said hydraulic hoses are restrained for movement by said supporting system within the plane of said loop.

* * * * *

UNITED STATES PATENT OFFICE
CERTIFICATE OF CORRECTION

PATENT NO. : 3,882,886
DATED : May 13, 1975
INVENTOR(S) : Ronald E. Ely, et al

It is certified that error appears in the above–identified patent and that said Letters Patent are hereby corrected as shown below:

On the Title Page, Item [73], change the spelling of the assignee's corporate name from "Caterpillar Tractor Company" to ---Caterpillar Tractor Co.---.

Signed and Sealed this twenty-eight Day of October 1975

[SEAL]

Attest:

RUTH C. MASON
*Attesting Officer*

C. MARSHALL DANN
*Commissioner of Patents and Trademarks*